2,202,551

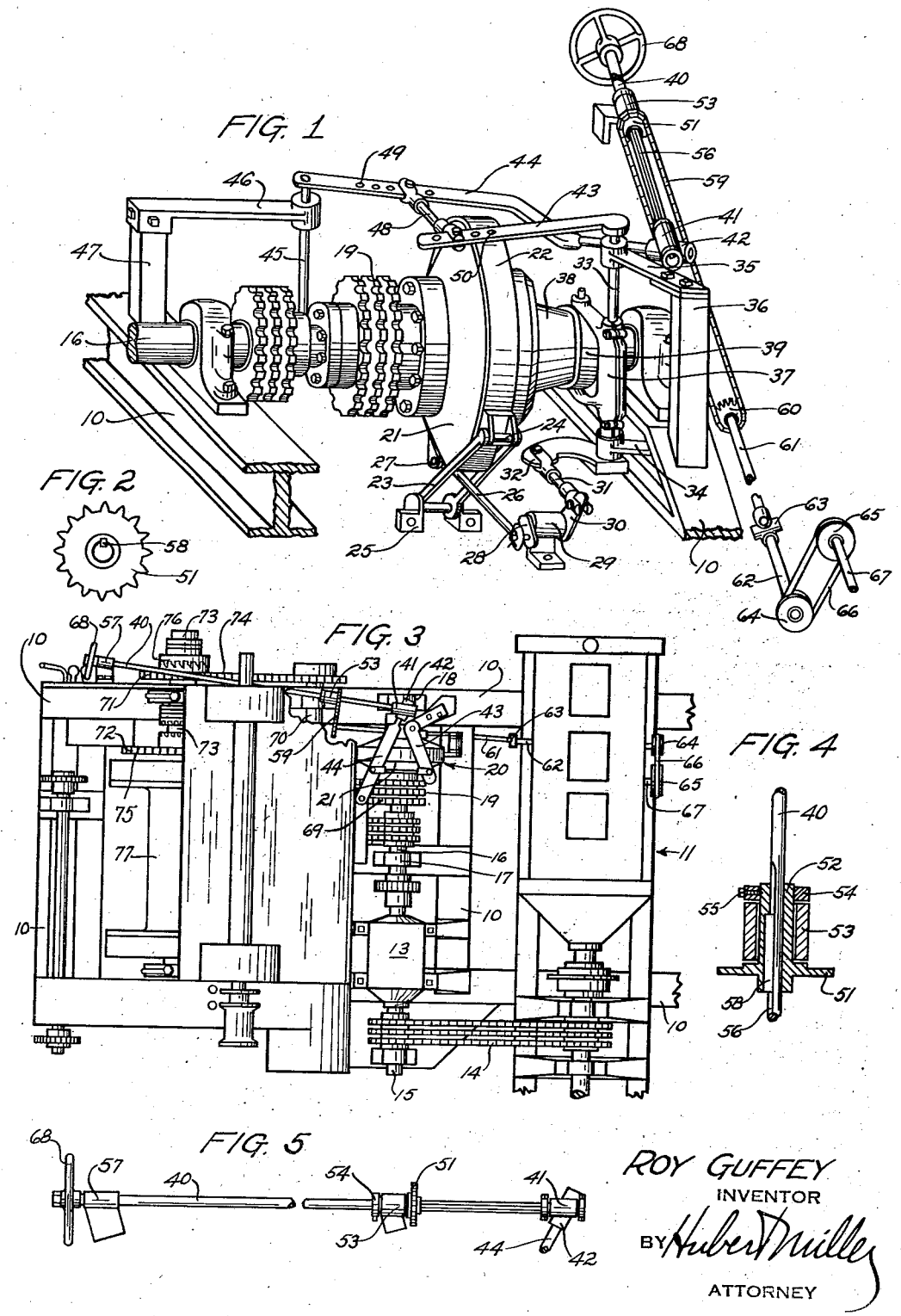
May 28, 1940.    R. GUFFEY    2,202,551
CONTROL MECHANISM
Filed May 1, 1939
ROY GUFFEY
INVENTOR Patented May 28, 1940

UNITED STATES PATENT OFFICE 2,202,551

CONTROL MECHANISM

Roy Guffey, Dallas, Tex., assignor to Jones, Shelburne & Guffey, Inc., Oklahoma City, Okla.

Application May 1, 1939, Serial No. 271,067

8 Claims. (Cl. 192—.01)

This invention relates to a combination clutch, brake, and accelerator control mechanism and to facilitate description, the invention is illustrated and explained in connection with a rotary well drilling rig only, but I wish it understood that this control mechanism is also adaptable for use with other types of power driven machinery.

The ordinary well drilling rig includes a prime mover and a draw works mounted in proximity, usually on a unitary sled-like base. The draw works usually includes a line shaft driven by the prime mover through a multi-speed transmission, drive sprockets on the line shaft, a main friction clutch for clutching the drive sprockets to the line shaft, a drum shaft, high and low speed sprockets on the drum shaft, positive engagement clutches for selectively connecting the high and low speed sprockets to the drum shaft, drive chains connecting the high and low speed sprockets respectively to the drive sprockets on the line shaft, or with aligned sprockets on a jack shaft which in turn is connected by a drive chain to a line shaft drive sprocket, spring means for automatically disengaging said high and low speed sprockets from the drum shaft when the drum is not actually being driven by the line shaft sprockets, a brake for the drum and its shaft, and individual controls for the three clutches, the brake, the prime mover accelerator, and for the multi-speed transmission.

As will be well understood by those familiar with such equipment, the drum serves as a hoist for lowering and raising casing, tubing, swabs, drill stem and the like into and out of the hole. It is often desirable to change from the low speed sprocket on the drum shaft to the high speed sprocket during the hoisting operation and without shifting gears in the transmission. With the usual draw works, as above described, in order for the driller to effect such a change he must almost simultaneously apply the brake to the drum shaft, disengage the line shaft friction clutch, and decelerate the prime mover. As soon as the line shaft friction clutch is disengaged the pull on the low speed sprocket ceases and the spring means previously mentioned disengages the low speed clutch on the drum shaft thus freeing the low speed sprocket, its drive chain and the line shaft drive sprocket to rotation. The rotational momentum already set up in these two sprockets is very considerable, which is easily understood when it is considered that their combined weight is near 600 lbs. Since there is no brake for stopping their rotation in draw works of present construction, it is necessary for the driller to wait until friction and gravity have caused them to come to a rest before he can force the two halves of the high speed positive engagement clutch into engagement. Considering that a driller may of necessity have to engage the high and low speed clutches combined something like fifty times during one eight-hour tour, and that a wait of two to five minutes may be necessary before each engagement can be made, it can be seen that a machine so constructed is extremely inefficient and causes a considerable loss of valuable time, oftentimes for the entire drilling crew and not only for the driller. Another bad feature of draw works of present construction is that there are so many controls to be operated that the driller does not have enough hands and feet to operate the necessary ones simultaneously.

The two chief objects of my invention, therefore, are: first, to provide a brake for stopping the free rotation of the line shaft drive sprocket, its chains, and the high and low speed drum shaft sprockets; and second, to provide a single control for successively operating the line shaft clutch and the line shaft drive sprocket brake, and for simultaneously accelerating or decelerating the prime mover, thus making it possible for the driller to control these last mentioned parts of the draw works with one hand, leaving the other hand free for the operation of the drum shaft brake, or for engaging either the high or low speed drum shaft clutches in case hand controls instead of foot controls are provided.

The details in the construction of a preferred form of my invention, together with other objects attending its production, will be better understood from the following description when read in connection with the accompanying drawing, which is chosen for illustrative purposes only, and in which, Figure 1 is a perspective view of a portion of a draw works embodying my invention, and illustrates a portion of the line shaft, together with its drive sprockets, main clutch, and brake for the sprocket and its integral clutch member, as well as mechanism for controlling the clutch, the brake, and the prime mover accelerator;

Figure 2 is a top plan view of a sprocket which is shown mounted on the single control element in Figure 1, and which serves as a means for operating the prime mover accelerator;

Figure 3 is a top plan view of a draw works embodying my invention, together with a prime mover, the two being mounted on a unitary sled-like base;

Figure 4 is a sectional view through the sprocket shown in Figure 2, its journal bracket, and a portion of the single control element, and illustrates the manner of permitting the control element relative longitudinal movement through the sprocket while at the same time maintaining a locked rotational relation between the two; and, Figure 5 is a side view of the single control element with the sprocket operably associated therewith, together with means for operably connecting one end of the element to a brake and clutch operating mechanism.

Like characters of reference designate like parts in all the figures.

Referring to Figure 3, the draw works sled-like base is designated as a whole by the numeral 10, and the prime mover is designated as a whole by the numeral 11. A multi-speed transmission 13 is provided adjacent the prime mover and a chain 14 operatively connects the prime mover shaft and the transmission shaft 15. A line shaft 16, journaled in bearings 17 and 18, is provided intermediate its ends with a three-row clutch faced drive sprocket 19, which is selectively clutched to the shaft 16 by means of a friction clutch 20 of any suitable construction. The clutch faced drive sprocket is provided with a concentric, outwardly extending, brake drum 21, which is adapted to be contacted by a brake band 22 which substantially surrounds the drum 21, as is clearly seen in Figure 1. One end of the brake band 22 is mounted adjacent the drum 21 by means of a connector link 23, one end of which is pivotally secured to the brake band at 24, and the other end of which is pivotally mounted in a suitable bracket 25, which in turn is secured to an adjacent portion of the draw works base 10. The other end of the brake band 22 is pivotally secured to one end of a link 26 at 27, the other end of this link being pivotally connected to the outer end of one lever arm 28 of a rock shaft which is journaled in a suitable bracket 29. The other end of the rock shaft is also provided with a lever arm 30, the outer end of which is connected to one end of an adjustable link 31, the other end of the link 31 being pivotally connected to a rocker arm 32, which is rigidly mounted on the lower end of a rock shaft 33. The rock shaft 33 is journaled in brackets 34 and 35 which are rigidly secured respectively to adjacent portions of the base 10 and of the draw works frame 36.

It will thus be seen that as the rock shaft 33 is rocked in one direction, the movable end of the brake band 22 is moved in a direction to free the band from contact with the brake drum 21, and when the rock shaft 33 is rocked in the opposite direction the band 22 is tightened and contacts the drum 21, applying the brake and stopping the rotation of the sprocket 19.

Intermediate its ends, the rock shaft carries a clutch yoke 37 which is of usual construction and which is adapted to move the clutch element 38 into and out of engagement with the complemental clutch element, (not visible), which is on the inside face of the drum 21. The clutch element 38 is non-rotatably but slidably secured on the shaft 16 and simply rotates freely within the clutch collar 39 when it is not engaged with its complemental clutch element. It will be noted that the relative arrangement of the clutch yoke 37 and the rocker arm 32 on the rock shaft 33 is such that when the rock shaft is moved in one direction the clutch element 38 will be moved away from the drum 21 and freed of its engagement therewith before the lever 28 has been moved sufficiently to actually bring the brake band 22 into engagement with its drum 21, also that when the rock shaft 33 is moved in the opposite direction the brake band 22 is moved out of contact with its drum 21 before the faces of the two clutch elements actually come into contact with each other.

As a means of rocking the shaft 33 within its journals, I provide a control rod 40 which is supported for both longitudinal reciprocatory and axial oscillatory movement. The oscillatory movement is not necessary simply for the rocking of the shaft 33 but it has a very definite purpose in my invention, which purpose will be hereinafter explained in detail. Near one of its ends the rod 40 is rotatably and slidably supported in a journal bracket 57 which is mounted rigidly on any adjacent portion of the draw works frame. At its opposite end the rod 40 is rotatably journaled in one half 41 of a ball joint. In order to increase the force of application of the rocking movement to the shaft 33, I provide a comparatively long lever 44 journaled at one of its ends on a shaft 45, which in turn is rotatably journaled in a pair of spaced brackets 46 (only one of which is shown in the drawing), which in turn are rigidly supported on an adjacent portion of the base 10, or on a rigid brace 47. The opposite end of the lever 44 carries one half 42 of the previously mentioned ball joint. A link 48 has one of its ends pivotally secured to the lever 44 intermediate its ends, and has its opposite end pivotally secured to the lever 43 intermediate its ends. I provide a plurality of perforations 49 and 50 in each of these levers so that the desired leverage and movement may be imparted to the rock shaft 33.

As previously stated, this invention contemplates the control of the prime mover accelerator by the same control rod 40, which serves also to apply and release the brake, and to engage and disengage the clutch.

The accelerator control will now be described. I provide a small sprocket 51 which carries an integral sleeve 52. The sprocket and its sleeve are rotatably supported in a journal bracket 53, which in turn may be rigidly attached to any adjacent portion of the draw works framework. End play between the sprocket and its bracket 53 is prevented by a collar 54 which is secured to the protruding end of the sleeve 52 by means of a set screw 55 (Fig. 4). Such an arrangement permits the sprocket 51 and its sleeve 52 to be freely rotated within the bracket 53 by the rod 40, but also permits the rod 40 to reciprocate longitudinally through the sprocket and its sleeve without imparting any longitudinal movement to the sprocket. The rod 40, as will be seen clearly in Figure 4, is provided with a longitudinally extending groove 56 which preferably extends from one extreme end to a point near the other end, and which slidably receives a key 58 which is rigidly secured within the sprocket 51 or which may be made integral therewith if desired. As the rod 40 is reciprocated longitudinally, the key 58 seated in the groove 56 permits this longitudinal movement but also locks the sprocket to the rod 40 so that if the rod is rotated the sprocket is also rotated.

It will be understood that any suitable mechanism may be used to connect the sprocket 51 and the prime mover accelerator. As a matter of experiment I have even used a worm gear instead of a sprocket, together with a toothed gear sector mounted on a rod which transmitted the rotary movement to the accelerator. In the illustration, however, and in the form of the invention which I prefer to use in connection with a draw works, I provide a drive chain 59 which connects the sprocket 51 with a second sprocket 60, which in turn is mounted on a rotatably supported rod 61, which rod is connected to a second rod 62 by means of a universal joint 63, which joint permits the rods 61 and 62 to be positioned out of axial alignment with each other. The rod 62 is provided with a pulley 64 which is connected to a second pulley 65 by means of a belt 66, the pulley 65 being mounted on an accelerator actuating rod 67. The free end of the control rod 40 is preferably provided with a handle 68 which facilitates manual impartation of simultaneous, longitudinal, reciprocal, and axial oscillatory movement to the rod.

With such an arrangement it will be seen that when the driller wishes to free the sprocket 19 from its driven relation with the line shaft 16 it is only necessary for him to grasp the handle 68 with one hand and pull the rod 40 toward him (to the left in Fig. 3), at the same time rotating the rod to decelerate the prime mover. This action operates the levers 44 and 43, the rock shaft 33 causes the yoke 37 to force the clutch element 38 to move out of contact with its complemental clutch element, and successively forces the brake band 22 to contact the drum 21, stopping the sprocket 19 from rotation on the shaft 16. Naturally the drive chain which runs on the sprocket 19, as well as any other sprocket on which the chain runs will also be stopped. In the particular draw works illustrated the drive chain 69 is used to connect the sprocket 19 and another sprocket (not shown) on a short counter shaft 70. The counter shaft 70 carries a pair of spaced sprockets, one small and one large, for respectively driving high speed and low speed sprockets 71 and 72 which are mounted on a drum shaft 73, by means of drive chains 74 and 75. In the instant illustration a high speed clutch element 76 is shown engaging the clutch faced sprocket 71 for driving the drum shaft 73 and its drum 77 at high speed. So long as the prime mover is laboring to drive the drum 77, the clutch element 76 will remain engaged with the sprocket 71. Whenever the rod 40 is moved to the left in the Figure 3 illustration, the main clutch 20 on the line shaft 16 is disengaged, and the spring means previously mentioned automatically frees the clutch element 76 from its driving relation with the sprocket 71. If the movement of the rod 40 is stopped as soon as the main clutch is disengaged, then the sprocket 71, its chain 74, together with the line shaft 70, and its sprockets, and the drive chain 69, and the sprocket 19, are free to rotate due to their momentum. The further outward movement of the rod 40, however, applies the brake band 22 to the drum 21 and stops the movement of all these elements. As quick as their motion is stopped, and this stoppage is almost instantaneous, it is possible for the driller to immediately engage either the high speed or low speed clutches on the drum shaft 73, as desired, and to move the rod 40 in the opposite direction, thus releasing the brake band 22 and engaging the main clutch and starting the drum 77 to rotate again.

From the above description and from the accompanying drawing, it will be seen that I have provided a single control element for operating mechanism which in turn operates a clutch, a brake, and an accelerator. The single control element may be operated with one hand only and leaves the other hand of the driller free to perform other duties. This invention greatly facilitates a quick change from a high speed drive to a low speed drive on all variable speed machinery to which it is adaptable.

While I have described and illustrated only one embodiment of the invention, and have illustrated it in connection with well drilling equipment, I am aware that numerous changes and alterations may be made in the invention, particularly for adapting it to other types of machinery and equipment, and I do not wish to be limited, except by the prior art and by the scope of the appended claims.

I claim:

1. A combination brake, clutch, and engine throttle control mechanism comprising: a rod mounted for simultaneous limited longitudinal reciprocating and axial oscillatory movement; operative connections between said rod and said engine throttle for actuating said throttle as said rod is rotated in either direction regardless of the relative longitudinal position and movement of the rod; and operative connections between said rod, said brake and said clutch for releasing said brake and successively engaging said clutch as said rod is moved from one end of its throw to the opposite end thereof, and for disengaging said clutch and successively applying said brake as said rod is moved from said opposite end of its throw to the first mentioned end thereof.

2. A combination brake, clutch, and engine throttle control mechanism comprising: a rod mounted for simultaneous limited longitudinal reciprocatory and axial oscillatory movement; operative connections between said rod and said engine throttle for actuating said engine throttle as said rod is rotated in either direction regardless of the relative longitudinal position or movement of said rod; a system of levers effecting an operative connection between said rod and said clutch; and a system of levers effecting an operative connection between the first mentioned system of levers and said brake, said two systems of levers so interconnected as to release said brake and successively engage said clutch as said rod is moved from one end of its throw to the opposite end thereof, and to disengage said clutch and successively apply said brake as said rod moves from said opposite end of its throw to the first mentioned end thereof.

3. The combination with a prime mover and means for controlling its speed of operation, with a shaft adapted to be driven by said prime mover, with a power take-off associated with said shaft, with clutch drive means for selectively controlling said power take-off, and with a brake associated with said clutch and said power take-off, of a combination brake, clutch and prime mover control means comprising: a rod mounted for simultaneous limited longitudinal reciprocatory and axial oscillatory movement; mechanism effecting an operative connection between said rod and said brake and between said rod and said clutch for releasing said brake and successively engaging said clutch as said rod is moved from one end of its throw to the opposite end thereof, and for disengaging said clutch and successively applying said brake as the rod is moved from said opposite end of its throw to the first mentioned end thereof; and independent mechanism effecting an operative connection between said rod and said means for controlling the speed of operation of said prime mover for actuating said controlling means as the rod is rotated in either direction regardless of the relative longitudinal position and movement of the rod.

4. A combination brake, clutch, and engine throttle control mechanism comprising: a rod mounted for limited simultaneous longitudinal reciprocatory and axial oscillatory movement; a concentric sprocket independently and rotatably mounted intermediate the ends of said rod, said sprocket adapted to be rotated within its mounting by said rod and to simultaneously afford free longitudinal reciprocatory movement for the rod; operative connections between the sprocket and the engine throttle; and means effecting an operative connection between said rod, said brake, and said clutch for releasing said brake and successively engaging said clutch as said rod is moved from one end of its throw to the opposite end thereof and for disengaging said clutch and applying said brake as the rod is moved from said opposite end of its throw to the first mentioned end thereof.

5. A combination brake, clutch, and engine throttle control mechanism comprising: a rod mounted for limited simultanous longitudinal reciprocatory and axial oscillatory movement; a concentric sprocket independently and rotatably mounted intermediate the ends of said rod, said sprocket adapted to be rotated within its mounting by said rod and to simultaneously afford free longitudinal reciprocatory movement for the rod; operative connections between the sprocket and the engine throttle; a system of levers effecting an operative connection between said rod, said brake, and said clutch for releasing said brake and successively engaging said clutch as said rod is moved from one end of its throw to the opposite end thereof and for disengaging said clutch and applying said brake as the rod is moved from said opposite end of its throw to the first mentioned end thereof.

6. In a well drilling rig, the combination with an internal combustion engine having a throttle for acceleration and deceleration of its crank shaft rotation, with a rotatably supported shaft, with driving connections between the shaft and the engine crank shaft, with a power take-off associated with the driven shaft, with a clutch for operatively connecting the shaft and the power take-off, and with a brake associated with the clutch and the power take-off for applying a braking action to the power take-off, of means for selectively operating said brake, said clutch, and said engine throttle comprising: a control rod mounted for limited simultaneous longitudinal reciprocatory and axial oscillatory movement; a sprocket mounted concentrically intermediate the ends of said rod and rotatable thereby; means for preventing the sprocket from following the rod as the latter is reciprocated longitudinally; operative connections between the sprocket and the engine throttle for operating the throttle as the sprocket is rotated by said rod in either direction; and a system of levers and connector links effecting an operative connection between said rod, said brake, and said clutch for respectively applying and releasing the brake and for inversely and respectively engaging and disengaging said clutch as the rod approaches the opposite ends of its limited throw.

7. In a well drilling rig, the combination with an internal combustion engine having a throttle for acceleration and deceleration of its crank shaft rotation, with a rotatably supported shaft, with driving connections between the shaft and the engine crank shaft, with a power take-off associated with the driven shaft, with a clutch for operatively connecting the shaft and the power take-off, and with a brake associated with the clutch and the power take-off for applying a braking action to the power take-off, of means for selectively operating said brake, said clutch, and said engine throttle comprising: a control rod mounted for limited simultaneous longitudinal reciprocatory and axial oscillatory movement; a sprocket mounted concentrically intermediate the ends of said rod and rotatable thereby; means for preventing the sprocket from following the rod as the latter is reciprocated longitudinally; operative connections between the sprocket and the engine throttle for operating the throttle as the sprocket is rotated by said rod in either direction; and means effecting an operative connection between said rod, said brake, and said clutch for respectively applying and releasing the brake and for inversely and respectively engaging and disengaging said clutch as the rod approaches the opposite ends of its limited throw.

8. In a drilling rig provided with a power unit, with a shaft driven by the unit, with clutch mechanism including a shiftable clutch engaging element, with brake mechanism and a brake control lever associated with said clutch mechanism, and with an accelerator for said power unit: a control element mounted for simultaneous limited longitudinal and rotary movement; a system of levers operably connecting one end of said control element to said brake control lever and to said shiftable clutch engaging element whereby when said control element moves longitudinally toward one end of its throw said brake control lever is moved in a brake applying direction and said shiftable clutch engaging element is moved in a non-engaging direction, and when said control element is moved toward the opposite end of its limited throw said brake control lever and said clutch engaging element are moved in the opposite direction; and operative connections between said control element and said accelerator for moving said accelerator in an accelerating direction when said control element is rotated in one direction and for moving the accelerator in a decelerating direction when said control element is rotated in the opposite direction regardless of the relative longitudinal position of said control element.

ROY GUFFEY.